United States Patent [19]

Lotfipour

[11] Patent Number: 5,460,250

[45] Date of Patent: Oct. 24, 1995

[54] BRAKE PAD FRICTION LININGS

[75] Inventor: Mahmoud Lotfipour, Stockport, United Kingdom

[73] Assignee: Ferodo Limited, Manchester, England

[21] Appl. No.: 397,732

[22] Filed: Mar. 2, 1995

Related U.S. Application Data

[63] Continuation-in-part of PCT/GB92/000568, Mar. 27, 1992 which is a continuation of Ser. No. 117,091, Sep. 9, 1993, abandoned.

[30]    Foreign Application Priority Data

Apr. 6, 1991 [GB] United Kingdom ............... 9107276

[51] Int. Cl.⁶ .............................................. F16F 9/50
[52] U.S. Cl. ..................................... 188/251 A; 523/156
[58] Field of Search ........................ 188/251 A, 251 R, 188/218; 192/107 M; 523/149, 152, 156

[56]               References Cited

U.S. PATENT DOCUMENTS

| | | | |
|---|---|---|---|
| 1,162,396 | 11/1915 | Price | 188/251 A |
| 3,751,330 | 8/1973 | Gilbert | 188/251 A X |
| 3,807,533 | 4/1974 | Ohtani | 188/24.12 X |
| 3,959,194 | 5/1976 | Adelmann | 188/251 A X |
| 4,173,681 | 11/1979 | Durrieu et al. | 188/218 XL |
| 4,195,679 | 4/1980 | Schoufeld et al. | 152/359 |
| 4,217,255 | 8/1980 | Griffith | 188/251 R X |
| 4,219,452 | 8/1980 | Littlefield | 188/251 A X |
| 4,373,038 | 2/1983 | Moran et al. | 188/251 A X |
| 4,737,535 | 4/1988 | Furukawa et al. | 524/113 |
| 4,914,248 | 4/1990 | Kitigawa et al. | 525/113 |

FOREIGN PATENT DOCUMENTS

| | | |
|---|---|---|
| 2068978 | 8/1971 | United Kingdom . |
| 2003088 | 3/1979 | United Kingdom . |

*Primary Examiner*—Robert J. Oberleitner
*Assistant Examiner*—Kevin D. Rutherford
*Attorney, Agent, or Firm*—Nixon & Vanderhye

[57]                ABSTRACT

A brake pad friction lining having, as required by UIC regulations for use on railways in Europe, a coefficient of friction under wet conditions not less than 85% of that under dry conditions, comprising a fibre-reinforced matrix of organic polymeric material which includes non-fibrous particulate material serving as friction or wear modifier or filler. The organic polymeric material employed according to the invention comprises cured high-hysteresis elastomeric material, for example a high-styrene/butadiene rubber, in a proportion by volume of the lining which is high enough to ensure a loss angle of at least 13° therein.

5 Claims, No Drawings

BRAKE PAD FRICTION LININGS

This is a continuation-in-part of PCT/GB/000568, Mar. 27, 1992, which is a continuation of application Ser. No. 08/117,091, filed Sep. 9, 1993, now abandoned.

This invention relates to brake pad friction linings, and particularly to linings for the brake systems of railway vehicles.

The friction linings of pads used in rail vehicle brake systems on the mainland of Europe are required by UIC regulations to have a coefficient of friction under wet conditions amounting to at least 85% of the dry coefficient. Such linings typically comprise a fibre-reinforced matrix of organic polymeric material (e.g. a cured nitrile rubber) which includes non-fibrous particulate material (e.g. carbon black, brass powder, barium sulphate) serving as friction or wear modifiers or fillers. The fibres, which may be of asbestos but are now more usually steel, mineral, glass or heat-resistant organic fibres such as aramid fibres, support the pad against undue distortion when it exerts friction on the flat surface of a moving element (such as a rotary disc) which it retards or stops when the two are brought into engagement.

The formulation of compositions curable to friction linings of the kind described has to take account of matters besides the attainment of a particular ratio of wet to dry friction. Additionally, care has to be taken that the combination of ingredients chosen does not result in a pad lining which wears out too quickly or is itself so abrasive that it causes damage to the disc or like element which it is to stop. It is accordingly understandable that linings in pads to be supplied as replacements may on examination often be found to have a ratio of wet:dry friction considerably less eg 70–75:100 than that called for by regulation.

The present invention provides friction linings which have a more acceptable balance of properties, and arises from our idea of incorporating in the fibre-reinforced matrix a high-hysteresis elastomeric material, such as those whose use in the car tire industry gives tires of improved wet road holding or wet skid resistance.

According to the invention there is provided brake pad friction lining comprising a fibre-reinforced matrix of organic polymeric material which includes non-fibrous particulate material serving as friction or wear modifier or filler, in which the organic polymeric material comprises cured high-hysteresis elastomeric material in a proportion by volume of the lining which is high enough to ensure a loss angle greater than 15° therein.

How the loss angle is determined is shown in the Example which appears later in this specification. The method employed (a dynamic test) is conventional for visco-elastic materials of the kind used here.

Preferably the high-hysteresis elastomeric material is a styrenebutadiene rubber styrene content at least 30%, and preferably at least 33% by weight. It is conveniently employed in oil-extended form. It is preferred that not all the polymeric material of the matrix should be constituted by high-hysteresis elastomer, and it is convenient to use with the latter ("B") a styrene-butadiene rubber ("A") of bound styrene content below 30% by weight, suitably in weight proportion A:B which is less than 1:1.

To prevent excessive deformation of the lining during braking it is preferred that the organic polymeric material of the matrix should include a cured phenolic resin, preferably a cured resol.

Preferably the predominant fibrous volume-component of the lining is metallic, particularly steel fibre. Alternatively there may be used mineral fibres, glass fibres or heat-resistant organic fibres (such as those of the aramid type), but these are preferably used in admixture with metal fibres, and preferably in a lower proportion by volume.

Brass powder is suitably employed as heat-conductive reinforcing filler and barium sulphate as inert filler.

Although the loss angle of the lining has earlier been specified as "greater than 15°", it is a straightforward matter to obtain by the invention linings of minimum loss angle 16, 17, 18° etc, but this will of course require adjustment of the proportions of the various ingredients employed so as to retain acceptable wear resistance.

The invention further illustrated by the following Example.

EXAMPLE

The following ingredients were mixed in a Banbury mixer.

|  | % by volume |
|---|---|
| Cold-polymerised styrene-butadiene rubber, oil-extended (Europrene 1721; bound styrene 40%; oil content 37.5 phr) | 28.0 |
| Styrene-butadiene rubber of bound styrene content 23% | 16.0 |
| Phenolic resin | 7.0 |
| Curing system (sulphur; accelerators; activators) | 6.6 |
| Antioxidant | 3.4 |
| Steel fibre | 12.0 |
| Mineral fibre | 6.0 |
| Friction modifier | 7.0 |
| Brass powder | 7.0 |
| Barium sulphate | 7.0 |
|  | 100.0 |

The resulting unitary mass was disintegrated. From the crumb thus formed test pad linings were conventially cold-moulded to shape direct onto a back plate of steel under a pressure of about 3 tsi (46 MPa) and then baked in an air-circulation oven for 4 hours at 200° C. under a clamping pressure of 9 psi (62 kPa). The linings had a modulus of compression of $10^4$ psi (69 MPa). Their mean coefficient of dynamic friction was 0.35, measured at a clamping force of 250 kN/m² against a cast iron brake disc in a simulated stop from 200 kph. The friction coefficient under wet conditions was 0.31.

Samples measuring 45mm×45mm×ca 15 mm were cut from the linings and submitted to compression tests on an INSTRON M1342 machine using an Instron Elastomer Test Program (version EV 2.5) with Strain Option. Tests were carried out at 22° C. at a range of frequencies (10–100 Hz), with zero load between successive tests. "Loss angle" is a parameter commonly used in the assessment or comparision of elastomeric materials. It is routinely expressed as the ratio of inelastic (viscous) modulus (normally referred to as G") to the elastic modulus (normally referred to as G') of the material under test. This viscous to elastic ratio (G"/G') is referred to as the "loss tangent", more commonly known as "loss angle".

Typical results calculated by the correlation method were:

| Test no | Freq Hz | Mean level kN | Amplitude mm | Loss angle Deg | Complex modulus N/mm² | Energy loss J/m³ |
|---|---|---|---|---|---|---|
| 1 | 10 | −0.6 | 0.01 | 16.0 | 200 | 84 |
| 2 | 20 | −0.6 | 0.01 | 18.0 | 230 | 103 |
| 3 | 30 | −0.6 | 0.01 | 18.5 | 240 | 116 |
| 4 | 40 | −0.6 | 0.01 | 19.0 | 260 | 124 |
| 5 | 50 | −0.6 | 0.01 | 20.0 | 270 | 133 |
| 6 | 60 | −0.6 | 0.01 | 20.0 | 270 | 137 |
| 7 | 70 | −0.6 | 0.01 | 20.5 | 280 | 145 |
| 8 | 80 | −0.6 | 0.01 | 20.5 | 290 | 149 |
| 9 | 90 | −0.6 | 0.01 | 21.0 | 300 | 156 |
| 10 | 100 | −0.6 | 0.01 | 21.0 | 300 | 158 |

For purposes of definition of loss angle, we take the value obtained at a frequency of 10 Hz i.e. 16°.

For comparison, we set out the loss angle (determined exactly as above) of each of two railway brake pad linings currently available.

|  | Loss angle |
|---|---|
| Lining 1 | 11.5° |
| Lining 2 | 10.0° |

I claim:

1. A brake pad friction lining and a metal backing plate bonded to it, said friction lining comprising a rigid, fiber-reinforced matrix of cured phenolic resin which contains metallic, mineral, glass or organic fibers, non-fibrous particulate material serving as friction or wear modifier or filler, and a cured high-hysteresis elastomeric material in a proportion by voltune of the friction lining which is high enough to ensure a loss angle greater than 15° therein, wherein the high-hysteresis elastomeric material is a styrene-butadiene rubber A of bound styrene content less than 30% by weight and a styrene-butadiene rubber B of bound styrene content of at least 30% by weight, the weight proportion A:B being less than 1:1.

2. Brake friction lining according to claim 1, which contains steel fibres.

3. Brake pad friction lining according to claim 1, which contains mineral fibres, or heat-resistant organic fibres.

4. Brake pad friction lining according to claim 1, which contains brass powder.

5. Brake pad friction lining according to claim 1, which contains barium sulphate.

* * * * *